United States Patent [19]
Tuffias et al.

[11] 3,834,775
[45] Sept. 10, 1974

[54] FERROHYDRODYNAMIC LOW-FRICTION BEARING WITH IMPROVED VOLUME COMPENSATION AND FLUID SEAL

[75] Inventors: Robert H. Tuffias, Los Angeles; Harry D. Larson, Northridge, both of Calif.

[73] Assignee: Litton Systems Inc., Beverly Hills, Calif.

[22] Filed: May 26, 1972

[21] Appl. No.: 257,434

[52] U.S. Cl............... 308/36.3, 277/26, 277/80, 308/9
[51] Int. Cl. ......................................... F16c 33/82
[58] Field of Search .......... 308/36.3, 10, 9; 277/80, 277/26

[56] References Cited
UNITED STATES PATENTS

| | | | |
|---|---|---|---|
| 3,097,853 | 7/1963 | McHigh | 277/80 |
| 3,384,427 | 5/1968 | McHugh | 308/10 |
| 3,439,961 | 4/1969 | Stiles | 308/9 |
| 3,612,630 | 10/1971 | Rosensweig | 308/10 |
| 3,620,584 | 11/1971 | Rosensweig | 308/187.1 |
| 3,726,574 | 4/1973 | Tuffias et al. | 308/36.3 |
| 3,734,578 | 5/1973 | Rosensweig | 308/10 |
| 3,746,407 | 7/1973 | Stiles et al. | 308/36.3 |

FOREIGN PATENTS OR APPLICATIONS 1,959,414  11/1969  Germany .............................. 277/26

*Primary Examiner*—Charles J. Myhre
*Assistant Examiner*—Barry Grossman
*Attorney, Agent, or Firm*—Donald J. Ellingsberg

[57] ABSTRACT

A self-contained, full film hydrodynamic bearing is provided having a ferrofluid (colloidal suspension of magnetic particles) with magnetic properties which facilitates retention of the fluid within the bearing where the bearing retains the ferrofluid over a wide temperature range and concomitantly compensates for ferrofluid expansion and contraction.

13 Claims, 3 Drawing Figures

PATENTED SEP 10 1974                                      3,834,775

3,834,775

FERROHYDRODYNAMIC LOW-FRICTION BEARING WITH IMPROVED VOLUME COMPENSATION AND FLUID SEAL

BACKGROUND OF THE INVENTION

Low-friction bearing are critical to the operation of certain machine systems, particularly sensitive inertial instruments.

Conventionally, ball bearings have provided low-friction supports but as the development of machine systems progressed, improved bearings were required with quiet running characteristics and long operating life. Since ball bearings could not always satisfy these requirements, low-friction bearings were developed that employ a fluid medium or lubricant, which can be either a liquid or a gas, for the support of an applied load.

However, a requirement continued to exist for improved liquid-lubricant, low-friction bearings that overcome the prior art problems both of conventional ball bearings and of gas bearings while combining the most attractive features of both bearing systems.

Such a liquid-lubricant, low-friction bearing has been developed and disclosed in Ser. No. 171,692, filed Aug. 13, 1971, now U.S. Pat. No. 3,726,574 (Docket No. GCD-13) for a "Ferrohydrodynamic Low-friction Bearing with Volume Compensator," and assigned to the same assignee as the present invention. The improved ferrohydrodynamic bearing of the present invention is based upon the principles of operation of the ferrohydrodynamic bearing as disclosed therein.

Operation of the ferrohydrodynamic, low-friction bearing over a wide temperature range requires compensation for ferrofluid expansion and contraction so that the ferrofluid will not be forced out at higher temperatures, either operating temperatures or production outgassing temperatures, and gas will not be admitted at lower temperatures.

Situations often exist in which a ferrohydrodynamic, low-friction bearing will be subjected to a more severe environment when inoperative than when operative. To prevent degrading, the bearing can be designed to withstand the severe environment or can be designed to protect the bearing for the severe environment when inoperative. Such a situation can exist when a ferrohydrodynamic bearing is vacuum baked at a considerably higher temperature than the normal operating temperature of the machine system wherein the bearing is used. The bearing as disclosed in the copending application is satisfactory when the operating temperature is considerably lower than the vacuum bake-out temperature, but when these temperatures differ by only a small amount, for example, 220° Fahrenheit, the gap between a volume compensator, such as a bimetallic member and a rotating stop becomes prohibitively small under operating conditions.

OBJECTS OF THE INVENTION

Accordingly, it is an object of the invention to provide a new and improved ferrohydrodynamic, low-friction bearing.

It is an object of the invention to provide a ferrohydrodynamic bearing having volume compensation for an incompressible fluid lubricant over a wide temperature range.

It is an object of the invention to provide a ferrohydrodynamic bearing that retains a fluid lubricant during outgassing of the lubricant while maintaining an increased running gap.

It is an object of the invention to provide a ferrohydrodynamic bearing that minimizes loss of lubricant.

SUMMARY OF THE INVENTION

Briefly, in accordance with one form of the invention, a new and improved ferrohydrodynamic low-friction bearing is provided having a bearing assembly that includes at least first and second members for the support of a load, and a magnetizable fluid having a colloidal suspension of magnetic particles that develops a lubricant film contact with the first and second members. The bearing assembly has a limit stop member and a compensator member movable, respectively, in a first direction and a second direction in response to a predetermined temperature range where the first direction is in general opposition to the second direction so that the members impinge at a predetermined temperature and develop a physical fluid seal. The bearing assembly further has a magnetic seal that acts upon and retains the magnetizable fluid so that the developed lubricant film contact with the first and second members is maintained without leakage of the fluid. Thus, the limit stop member, the compensator member, the magnetizable fluid, and the magnetic seal, coact and develop a zero-leakage fluid seal in the bearing assembly over a temperature range.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawings.

DESCRIPTION OF THE INVENTION

Figure 1:
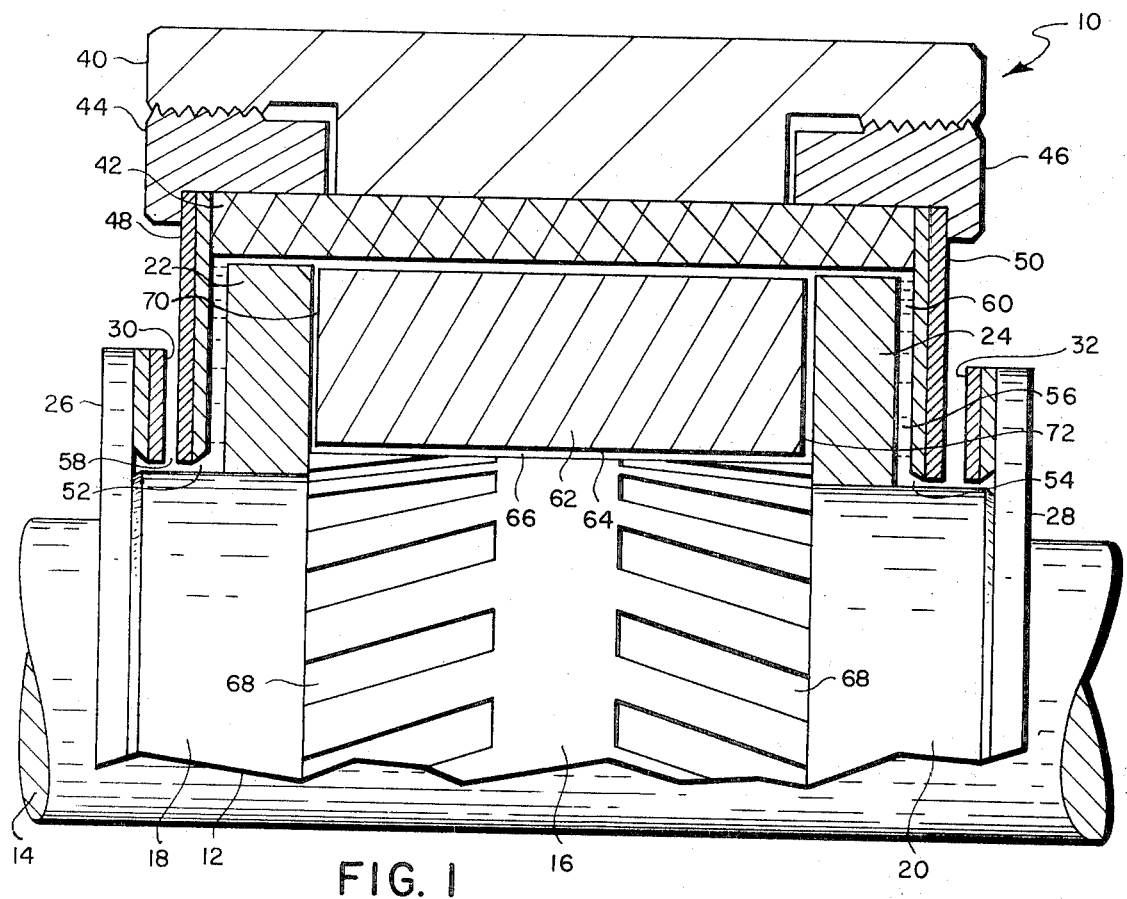
FIG. 1 is a sectional view, partly broken away, of one form of ferrohydrodynamic bearing of the invention.

Referring to FIG. 1, a spool bearing assembly 10 has a ferromagnetic journal member 12 fixed to or an integral part of a rotatable shaft 14 and rotatable therewith. The journal member 12 has an intermediate land portion 16 suitably formed between journal end portions 18 and 20. Non-magnetic thrust pad members 22 and 24 are respectively positioned on and connected to journal end portions 18 and 20, and are longitudinally spaced apart by the intermediate land portion 16 of the journal member 12. The thrust pad members 22 and 24 are rotatable with the journal member 12. A pair of flanged members 26 and 28 are respectively positioned in an abutting relationship with the journal end portions 18 and 20, and are connected thereto so that the flange members are rotatable with the journal member 12. The non-magnetic flange members 26 and 28 extend outwardly beyond the journal end portions 18 and 20, and have connected thereto bimetallic limit stop members 30 and 32 for the purpose of temperature sealing of the spool bearing assembly 10 when the bearing is stationary as described hereinafter in greater detail. The foregoing components are rotatable with the shaft 14 and comprise the rotating or rotor portion of the bearing assembly 10 as illustrated by FIG. 1.

The spool bearing assembly 10 of FIG. 1 has a nonmagnetic support member 40 which can be connected to or be an integral part of a housing member (not shown). A magnet 42 is positioned within the support member 40 and retained therein by similar nonmagnetic threaded clamp nut members 44 and 46 that are threaded into adjustable engagement with support member 40. The clamp nut members 44 and 46, respectively, can be adjusted to limit the travel of bimetallic, ferromagnetic pole shoe members 48 and 50 as described hereinafter in greater detail.

The inwardly extending and bimetallic pole shoe members 48 and 50 develop a desired path for the magnetic flux field which is set up by the magnet 42 and further act to concentrate the magnetic flux at respective gaps 52 and 54 which are fluid filled during operation of the bearing assembly. The bimetallic pole shoe members 48 and 50 also act, in accord with conventional bimetallic elements, to compensate for the expansion and contraction of a ferromagnetic fluid 56, which fills a chamber 60 generally bounded by the gaps 52 and 54, over a wide temperature range. That is, the bimetallic pole shoe members 48 and 50, which can be bimetallic washer members, expand in a first direction toward the bimetallic limit stop members 30 and 32 of flange members 26 and 28, respectively, with increasing temperature so that the change in the volume of the chamber 60 equals the change in ferromagnetic fluid volume caused by thermal expansion. The bimetallic pole shoe members 48 and 50, conversely, expand in a second direction which is generally in opposition to the first direction, away from the bimetallic limit stop members 30 and 32 of flange members 26 and 28 with decreasing temperature to compensate for ferromagnetic fluid volume contraction. The extent of temperature imposed deflection of the bimetallic pole shoe members 48 and 50 can be controlled within limits by the selected adjustment of the clamp nut members 54 and 56 relative to the respective pole shoe members.

Similarly, the bimetallic limit stop members 30 and 32, which can be bimetallic washer members, expand in the second direction with increasing temperature, and, conversely, expand in the first direction with decreasing temperature.

Where the maximum deflection of the bimetallic pole shoe members 48 and 50 in the first direction is represented as a finite deflection distance X, and where the maximum deflection of the bimetallic limit stop members 30 and 32 in the second direction is represented as a finite deflection distance Y; then the total maximum running gap 58 obtainable between adjacent pairs of the pole shoe members 48 and 50 and the limit stop members 30 and 32 is X + Y which is greater than the previously obtainable maximum running gap of the "Ferrohydrodynamic Low-Friction Bearing with Volume Compensator" as previously noted, and which is highly desirable.

The magnet 42 of the bearing assembly 10 of FIG. 1 develops a magnetic seal at gap 52 between the outer surface of journal end portion 18 and the pole shoe member 48. Similarly, a magnetic seal is developed at gap 54 between the journal end portion 20 and the pole shoe member 50. The magnetic seals are effected by the developed magnetic forces which constrain the ferromagnetic fluid to remain in the high magnetic field gradient region of the gaps.

The ferromagnetic fluid 56 has magnetic particles of subdomain size colloidally dispersed in a liquid carrier. A typical magnetic particle size is 100 Angstroms (4 × $10^{-7}$ in.), so that thermal agitation prevents the particles from settling or separating under the action of gravity or strong magnetic fields; that is, Brownian movement. The ferromagnetic fluid 56 can have different liquid bases; for example, water, kerosene, silicone oil, etc. One limitation for the choice of a carrier liquid base is that the liquid should be compatible with the magnetic particle surface coating. While the liquid properties of the liquid carrier can change with the addition of the magnetic particles to form the ferromagnetic fluid, a sufficient number of compatible liquid carriers are available so that any reasonable combination of liquid carrier properties can be achieved.

The ferrohydrodynamic fluid 56 for the bearing assembly 10 of FIG. 1 can have as a liquid carrier base a dielectric heat transfer fluid having the following properties:

| | |
|---|---|
| Absolute viscosity at 170°F | 4.0 cp |
| −65°F | 25.0 cp |
| Pour Point | −140°F |
| Density at 77°F | 0.892 gm/cm$^3$ |
| Coefficient of thermal expansion | 0.000576 cm$^3$/cm$^3$/°F |
| Vapor Pressure at 170°F | 5 mmHg |
| Saturation Magnetization | 200 gauss |

The magnet 42 of the bearing assembly 10 of FIG. 1, as previously described, develops a concentrated magnetic field at gap 52 and gap 54, and because of the previously described magnetic characteristics of the ferromagnetic fluid 56, the fluid develops a zero-leak seal at each of the gaps. Such magnetic seals can be leak-free to approximately 40 pounds per square inch absolute.

The magnetic seals developed at the gaps 42 and 44 eliminate contamination to the bearing from the environment that surrounds the bearing assembly, and also eliminate the requirement for a continuous lubricant supply since the magnetic seals contain the fluid lubricant in the bearing assembly over a wide temperature range.

Under certain stationary conditions, a bearing assembly such as the bearing assembly 10 of FIG. 1 is subjected to high temperature, high vacuum bakeout, i.e., non-operating outgassing, which would tend to boil off the ferromagnetic fluid 56. To prevent such boil off, the bimetallic limit stop members 30 and 32 of flange members 26 and 28 serve as movable limit stops in the second direction to the expansion of the bimetallic pole shoe members 48 and 50 in the first direction with increasing temperature so that adjacent pairs of the limit stop members 30 and 32 and the pole shoe members 48 and 50 impinge at a predetermined temperature and develop a physical seal that prevents loss of ferromagnetic fluid.

An inwardly extending, non-magnetic center member 62, suitably connected to and nonrotatable with the magnet 42, extends into a channel generally defined by the intermediate land portion 16 and thrust pad members 22 and 24. The foregoing components comprise the stationary or stator portion of the spool bearing assembly 10 of FIG. 1.

The previously described rotating and stationary components of the spool bearing assembly 10 of FIG. 1 are maintained in a desired spaced apart relationship by the hydrodynamic pressure developed in the ferromagnetic fluid 56 that is between and in film contact with the confronting surfaces of the rotor and stator portions of the spool bearing assembly 10 of FIG. 1.

As illustrated by FIG. 1, the spool bearing assembly 10 can be regarded as a combination of a journal bearing and a double-acting thrust bearing. The journal bearing is formed by intermediate land portion 16 and the confronting inner surface 64 of center member 62. When a radial load is applied to shaft 14, the bearing becomes eccentric in a conventional manner so that the fluid thickness varies in fluid gap 66 between land portion 16 and inner surface 64 of center member 62. The viscous drag that moving land portion 16 exerts on the fluid 56 impels the fluid within the fluid gap 66 and builds up a hydrodynamic pressure which, in the steady state, balances the radial load applied to shaft 14.

Hydrodynamic journal bearings, however, are potentially unstable. This instability can be prevented by cutting grooves 68 into the confronting surface of the land portion 16 which act to dissipate the destabilizing forces. When the grooves 68 have a spiral characteristic, such as shown by FIG. 1, the grooves also act to impel the fluid 56 toward the center of the bearing, i.e., the center of the intermediate land portion 16, which further prevents seal leakage from the bearing assembly by decreasing the fluid pressure at the magnetic gaps 52 and 54. It is understood that the bearing of the present invention can operate when the grooves 68 are omitted if this is desired.

Figure 3:
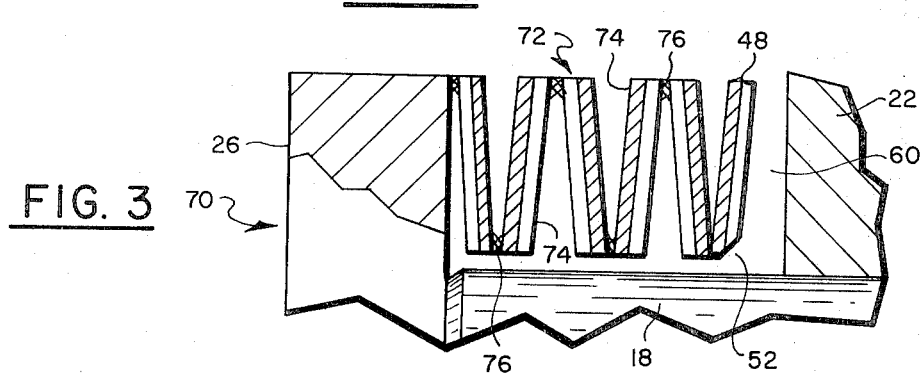
FIG. 3 is a sectional view, partly broken away, of the ferrohydrodynamic bearing of FIG. 2 at a second temperature.
Figure 2:
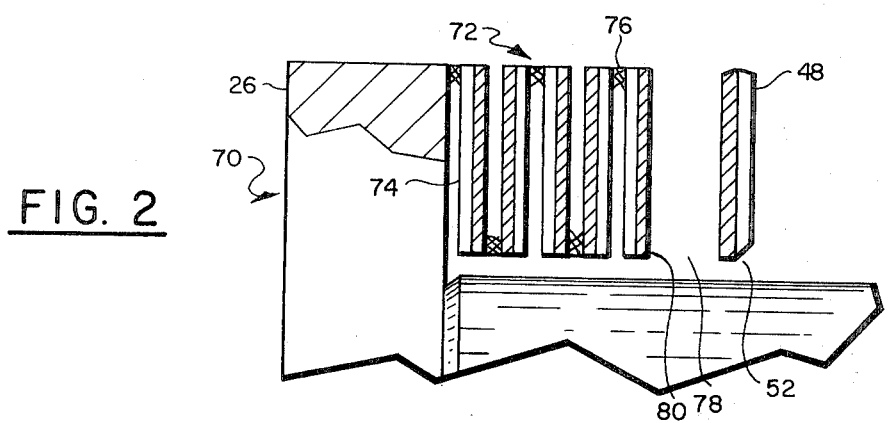
FIG. 2 is a sectional view, partly broken away, of another form of ferrohydrodynamic bearing of the invention at a first temperature.

FIGS. 2 and 3 illustrate another form of ferrohydrodynamic bearing assembly 70 of the present invention. The principle of operation is similar to the bearing assembly 10 shown by FIG. 1, and like parts as previously shown and described are identified by the same reference characters in FIGS. 2 and 3.

The total maximum running gap, such as gap 58 as shown by FIG. 1, can be increased by a limit stop member 72 that is an assembly of similar bimetallic units 74 which are series connected, for example, by similar welded joints 76. The bimetallic units 74 can be bimetallic washers that, when series connected as shown, form the limit stop member 72 which is similar in configuration to a bellows. Thus, the limit stop member 72 expands toward the bimetallic pole shoe member 48 with increasing temperature and, conversely, away from the pole shoe member with decreasing temperature.

In FIG. 2, the limit stop member 82 of the bearing assembly 70 is shown at a first temperature with a maximum gap 78 obtainable between the pole shoe member 48 and the unconnected edge 80 of the limit stop member. In FIG. 3, the limit stop member 72 is shown at a second temperature. The pole shoe member 48 and edge 80 of the limit stop member 72 impinge at a predetermined temperature, which can be the same as the second temperature or can be less than the second temperature, and develop the desired physical seal that prevents loss of ferromagnetic fluid 60.

Where the maximum deflection of the bimetallic pole shoe member 48 is again represented as a finite deflection distance X, and where the maximum deflection of each of the bimetallic units 74 of the limit stop member 72 is represented as a finite deflection distance Z; then the total maximum running gap 78 obtainable between the pole shoe member and edge 80 of the bearing assembly 80 of FIG. 4 is $X + Z_1 + Z_2 + Z_3 + Z_4 + Z_5$ which is greater than that obtainable with the ferrohydrodynamic bearing assembly 10 of FIG. 1.

As will be evidenced from the foregoing description, certain aspects of the invention are not limited to the particular details of construction as illustrated. It is contemplated that the bearing assembly of the present invention can be used whenever temperature is a variable to develop magnetic and physical seals, and thus can also be used under relatively low temperatures. It is contemplated that other modifications and applications will occur to those skilled in the art, and, therefore, it is intended that the appended claims shall cover such modifications and applications that do not depart from the true spirit and scope of the invention.

We claim:

1. A bearing assembly comprising:
   a. bearing means for the support of a load including at least first and second members developing a chamber having an adjustable volume,
   b. compensator means connected to said first member having a temperature responsive region movable in a first direction in response to a predetermined temperature range, said compensator means automatically adjusting said chamber volume in response to temperature,
   c. limit stop means connected to said second member having a temperature responsive region movable in a second direction in response to the predetermined temperature range, said second direction in opposition to said first direction,
   d. magnetizable fluid means within said chamber developing a lubricant film contact with said first and second members, and
   e. magnetic seal means acting upon and retaining said magnetizable fluid to develop a resulting magnetic fluid seal,
   f. said limit stop means and said compensator means impinging at a predetermined temperature to develop a resulting physical fluid seal.

2. The bearing assembly of claim 1 in which said magnetic seal means includes:
   a. magnetic means on said second member developing a magnetic flux field, and
   b. a magnetic flux concentrator portion of said compensator means spaced apart from said limit stop means concentrating the developed magnetic flux field through said magnetizable fluid means at and generally adjacent said concentrator portion.

3. The bearing assembly of claim 2 in which said magnet means is a permanent magnet.

4. The bearing assembly of claim 2 in which said magnet means is an electromagnet.

5. The bearing assembly of claim 2 in which said compensator means develops a magnetic flux path for said magnetic flux field between said magnet means and said magnetic flux concentrator portion.

6. The bearing assembly of claim 1 in which said magnetizable fluid means is a ferromagnetic fluid.

7. The bearing assembly of claim 1 in which said limit stop means and said compensator means are flexible members having a predetermined deflection in response to temperature.

8. The bearing assembly of claim 7 in which said first and second members are bimetallic elements.

9. The bearing assembly of claim 1 in which said compensator means has a maximum deflection distance X in said first direction and said limit stop means has a maximum deflection distance Y in said second direction so that a maximum running gap $X + Y$ is developed between said compensator means and said limit stop means at a predetermined temperature.

10. The bearing assembly of claim 9 in which said limit stop means includes at least first and second temperature responsive members interconnected to develop a maximum deflection distance $Z_1$ by said first temperature responsive member and a maximum deflection distance $Z_2$ by said second temperature responsive member so that a maximum running gap $X + Z_1 + Z_2$ is developed.

11. The bearing assembly of claim 10 in which said first and second temperature responsive members are series connected.

12. The bearing assembly of claim 10 in which said limit stop means includes a plurality of temperature responsive members and each of said temperature responsive members has a maximum deflection distance Z.

13. The bearing assembly of claim 12 in which said temperature responsive members are series-connected bimetallic elements.

* * * * *